(12) United States Patent
Arai et al.

(10) Patent No.: US 12,511,147 B2
(45) Date of Patent: Dec. 30, 2025

(54) FREQUENCY CONTROL DEVICE IN A SERVER, CONTROL METHOD, AND PROGRAM

(71) Applicant: NTT, Inc., Tokyo (JP)

(72) Inventors: Maiko Arai, Tokyo (JP); Kei Fujimoto, Tokyo (JP); Yusuke Ogata, Tokyo (JP)

(73) Assignee: NTT, Inc., Tokyo (JP)

( * ) Notice: Subject to any disclaimer, the term of this patent is extended or adjusted under 35 U.S.C. 154(b) by 687 days.

(21) Appl. No.: 17/802,220

(22) PCT Filed: Feb. 27, 2020

(86) PCT No.: PCT/JP2020/008166
§ 371 (c)(1),
(2) Date: Aug. 25, 2022

(87) PCT Pub. No.: WO2021/171520
PCT Pub. Date: Sep. 2, 2021

(65) Prior Publication Data
US 2023/0083604 A1 Mar. 16, 2023

(51) Int. Cl.
G06F 9/455 (2018.01)
(52) U.S. Cl.
CPC .............. *G06F 9/45558* (2013.01)

(58) Field of Classification Search
None
See application file for complete search history.

(56) References Cited

U.S. PATENT DOCUMENTS

| 2015/0074279 A1* | 3/2015 | Maes | H04L 67/51 709/226 |
| 2019/0272002 A1* | 9/2019 | Seenappa | G06F 1/324 |

FOREIGN PATENT DOCUMENTS

| JP | H11073273 | 3/1999 |
| JP | 2015197874 | 11/2015 |
| JP | 2018032156 | 3/2018 |

* cited by examiner

*Primary Examiner* — Wynuel S Aquino
(74) *Attorney, Agent, or Firm* — Fish & Richardson P.C.

(57) ABSTRACT

An in-server frequency control apparatus includes a preliminary grasp unit which preliminarily grasps a start of a service requiring low delay in a server and grasps termination of the service by a predetermined method, and an operating frequency change unit which changes an operating frequency of a CPU as a target to be controlled, which is a CPU allocated in advance to a receiver of the service in the server, at the time of the preliminarily grasped start of the service and at the time of the termination of the service. The operating frequency change unit makes the operating frequency of the target CPU higher than a predetermined value at the time of the start of the service and makes the operating frequency of the target CPU lower than the predetermined value at the time of the termination of the service.

6 Claims, 12 Drawing Sheets

FREQUENCY CONTROL DEVICE IN A SERVER, CONTROL METHOD, AND PROGRAM

CROSS-REFERENCE TO RELATED APPLICATION

This application is a National Stage Application under 35 U.S.C. § 371 of International Application No. PCT/JP2020/008166, having an International Filing Date of Feb. 27, 2020, and which application is incorporated herein by reference. To the extent appropriate, a claim of priority is made to the above disclosed application.

TECHNICAL FIELD

The present invention relates to an in-server frequency control apparatus, a control method, and a program.

BACKGROUND ART

As a technique for constructing a virtual machine, a hypervisor environment which is constructed using Linux (R) and KVM (kernel-based virtual machine) is well known. In such an environment, a host OS with a built-in KVM module operates as a hypervisor in a kernel space. In the environment, a virtual machine operates in a user space, and a guest OS operates in the virtual machine. The host OS here refers to an OS installed on a physical server. The kernel space refers to a memory region different from the user space. The guest OS refers to an OS installed on the virtual machine.

Patent Literature 1 discloses a system in which a guest OS and a host OS are connected by virtio. In a virtual machine, for example, virtio-net is present as a virtio device for network communication. In this system, packet transfer processing is speeded up by decreasing the number of times memory copying related to virtio-net is done.

Patent Literature 2 discloses a system using SPP (Soft Patch Panel) as an extension of Intel DPDK (Intel Data Plane Development Kit) that is a set of high-speed packet processing libraries. Here, Intel is a registered trademark. SPP performs, at high speed, packet copying between a host OS and a guest OS and between guest OSes through zero copy via a shared memory. In this system, setting of a route connecting virtual machines is enabled by a GUI (Graphical User Interface) manipulation in SPP.

CITATION LIST

Patent Literatures

Patent Literature 1: Japanese Patent Laid-Open No. 2015-197874
Patent Literature 2: Japanese Patent Laid-Open No. 2018-032156

SUMMARY OF THE INVENTION

Technical Problems

To implement a low-delay network end-to-end, it is necessary to implement low delay in each section, such as an access section, a transmission section, a transfer section, a server section, or an APL (Application). Curbing of a delay in the server section is important to implement a service high in real-time qualities. Additionally, the number of servers is increasing with a rapid increase in amount of information in recent years, and power consumption is increasing. For this reason, it is also important to cut power consumption of servers.

As a conventional approach to achieving both high server processing performance and power saving, there has been available an approach which predicts a processing load on a CPU and dynamically varies an operating frequency of the CPU. The approach is incorporated in the Linux kernel of recent years. Thus, the approach can be implemented by the techniques disclosed in Patent Literatures 1 and 2.

In the approach, a task scheduler manages, in the form of a queue, a process/thread task which is to use a CPU and predicts a load on each CPU on the basis of the number of tasks accumulating in a queue and dynamically changes an operating frequency of the CPU. However, the approach suffers a delay on the order of milliseconds. Since the task scheduler does not manage, as a task, interruption processing, such as packet processing, the task scheduler cannot predict a processing load and does not change an operating frequency of a CPU. When a kernel receives a packet while a CPU is operating at a low operating frequency, processing of the packet takes time, and a delay occurs. For this reason, as an approach to curbing such a delay, an approach which causes a CPU to operate while keeping an operating frequency of the CPU highest is conceivable. However, the approach is assumed to increase power consumption of a CPU. In a case where a service conditional on low delay in a server section and power saving is provided, the two frequency setting methods described above cannot meet the both conditions at the same time.

Under the circumstances, the present invention has as its object to solve the above-described problem and reduce power consumption of a server while performing low-delay processing in the server.

Means for Solving the Problems

An in-server frequency control apparatus of the present invention includes: a preliminary grasp unit configured to preliminarily grasp a start of a service requiring low delay in a server and grasp termination of the service by a predetermined method; and an operating frequency change unit configured to change an operating frequency of a CPU as a target to be controlled, the target CPU being allocated in advance to a receiver of the service in the server, at the time of the preliminarily grasped start of the service and at the time of the termination of the service. The operating frequency change unit is configured to make the operating frequency of the target CPU higher than a predetermined value at the time of the start of the service and also make the operating frequency of the target CPU lower than the predetermined value at the time of the termination of the service.

Effects of the Invention

The present invention makes it possible to reduce power consumption of a server while performing low-delay processing in the server.

DESCRIPTION OF EMBODIMENTS

An in-server frequency control apparatus of the present invention will be described below in detail with reference to the drawings.

A description will be given on the assumption that an example of a service (hereinafter simply referred to as a service) requiring low delay in a server is a conference call. First, a conference call system to which the in-server frequency control apparatus is applied will be described. A conference call system 1 shown in FIG. 1 includes an SIP server 2*a* and a media server 2*b*. The SIP server 2*a* performs session control between telephone sets 4 and the media server 2*b* using SIP (Session Initiation Protocol).

The media server 2*b* implements a conference call 5 based on voice communication using, for example, RTP (Real-time Transport Protocol). The media server 2*b* performs resampling, coding, and the like of media data, such as voice data, and generation of an RTP packet or the like, thereby implementing voice communication. The media server 2*b* is a receiver of the conference call 5. The telephone set 4 is a transmitter of the conference call 5 and is used by a user which has a conference call. Note that the number of telephone sets 4 is not limited to three shown in FIG. 1.

Figure 1:
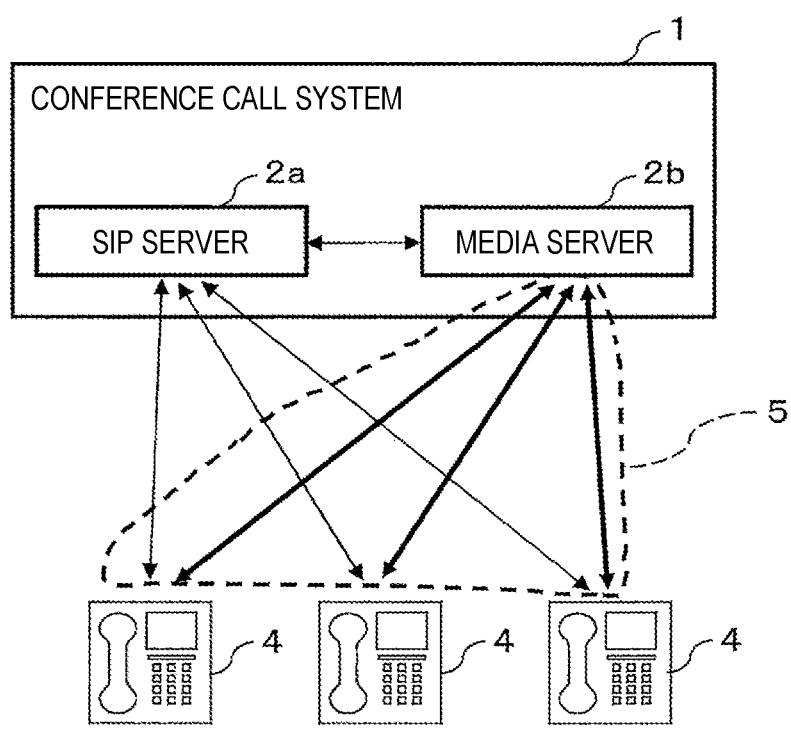
FIG. 1 is a schematic diagram showing a receiver and transmitters in a conference call system according to an embodiment of the present invention.
Figure 2:
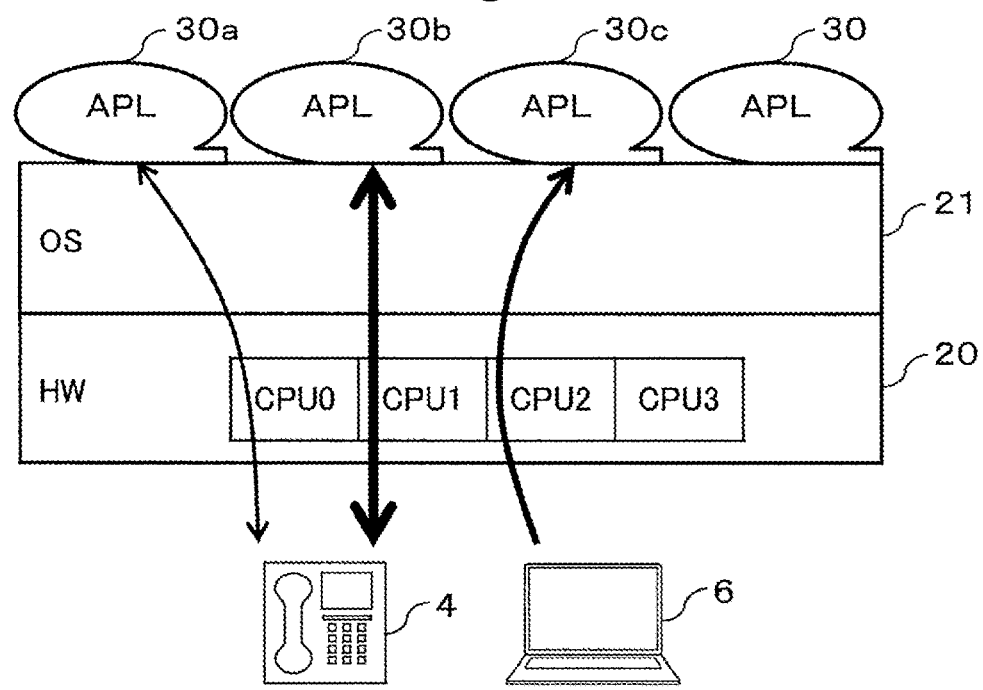
FIG. 2 is a schematic configuration diagram of the conference call system according to the embodiment of the present invention.

As shown in FIG. 2, the conference call system 1 includes an HW 20, an OS 21, and APLs 30, 30*a*, 30*b*, and 30*c* in a user space in order to implement the SIP server 2*a* and the media server 2*b* in FIG. 1. The HW 20 is hardware and includes a plurality of CPUs. By way of example, the HW 20 includes CPU0, CPU1, CPU2, and CPU3. The OS 21 is an operating system and includes a kernel and software for packet processing. The kernel is a function of a key portion of the operating system and manages an execution state of a program on a per-process basis.

The APLs 30, 30*a*, 30*b*, and 30*c* are application programs which operate on the OS 21. For example, CPU0 is allocated to the APL 30*a*. The APL 30*a* is an application program which preliminarily manages a stream and functions as, for example, the SIP server 2*a*. CPU0 makes data transmission and reception communication with the APL 30*a* via the OS 21.

For example, CPU1 is allocated to the APL 30*b*. The APL 30*b* is an application program which executes a service and functions as, for example, the media server 2*b*. CPU1 makes data transmission and reception communication with the APL 30*b* via the OS 21.

For example, CPU2 is allocated to the APL 30*c*. The APL 30*c* functions as, for example, a reservation scheduler. The reservation scheduler performs, for example, a process of reserving a conference call. CPU2 makes data transmission and reception communication with the APL 30*c* via the OS 21. The APL 30*c* functioning as the reservation scheduler accepts a reservation of a conference call when a user reserves the conference call using an information terminal 6. The information terminal 6 is composed of, for example, a general personal computer, a tablet terminal, or a smartphone.

For example, CPU3 is allocated to the APL 30. The APL 30 functions as, for example, an in-server frequency control apparatus 10 in FIG. 3.

First Embodiment

A conference call system including an in-server frequency control apparatus 10 according to a first embodiment will be described with reference to FIG. 3. Note that same components as those shown in FIG. 2 are denoted by same reference characters and that a description thereof will be omitted below.

The in-server frequency control apparatus 10 includes a preliminary grasp unit 11 and an operating frequency change unit 12. The preliminary grasp unit 11 preliminarily grasps a start of a service and grasps termination of the service by a predetermined method. The operating frequency change unit 12 changes an operating frequency of a CPU as a target to be controlled, which is a CPU to which a service is allocated in advance to a receiver of the service in a server, at the time of the preliminarily grasped start of the service and at the time of the termination of the service. The operating frequency change unit 12 makes the operating frequency of the target CPU higher than a predetermined value at the time of the start of the service and makes the operating frequency of the target CPU lower than the predetermined value at the time of the termination of the service.

Figure 3:
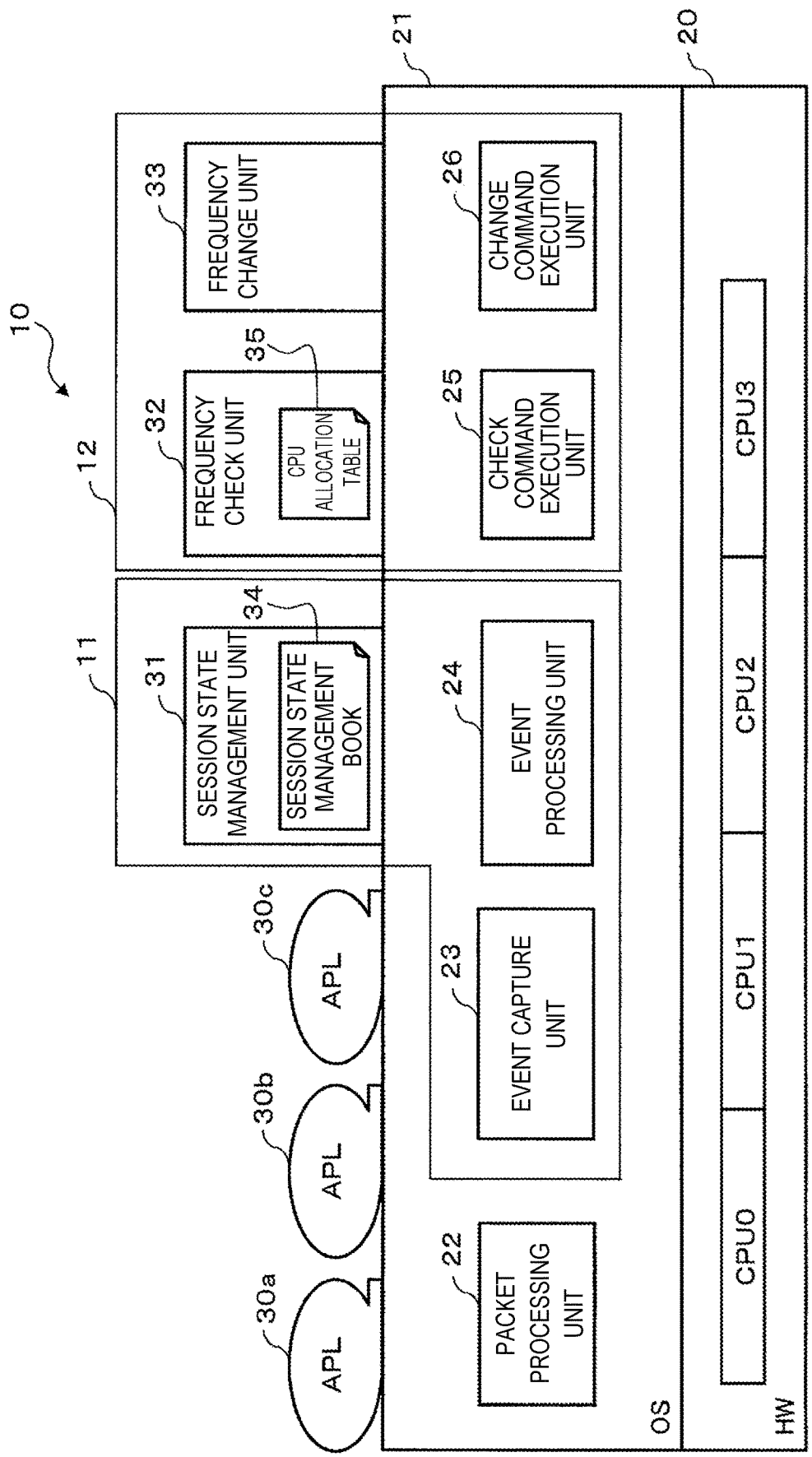
FIG. 3 is a configuration diagram of an in-server frequency control apparatus according to a first embodiment of the present invention.

As shown in FIG. 3, the preliminary grasp unit 11 includes, for example, an event capture unit 23, an event processing unit 24, and a session state management unit 31. The operating frequency change unit 12 includes, for example, a check command execution unit 25, a change command execution unit 26, a frequency check unit 32, and a frequency change unit 33. Here, the OS 21 includes, as processing functions of a kernel, a packet processing unit 22, the event capture unit 23, the event processing unit 24, the check command execution unit 25, and the change command execution unit 26. The session state management unit 31, the frequency check unit 32, and the frequency change unit 33 correspond to the APL 30 in FIG. 2 and operate on the OS 21. The OS 21 performs a process of changing an operating frequency of a CPU as a target to be controlled. Assume that, for example, CPU3 is allocated to a kernel process of changing an operating frequency of a CPU. Note that any CPU can be allocated to the kernel process of changing an operating frequency of a CPU and that CPU1 may be allocated.

Details of the units will be described below.

The packet processing unit 22 processes a packet related to SIP processing between CPU0 and the APL 30a. For example, when the packet processing unit 22 receives an INVITE request packet which is a session control start request from the telephone set 4, the packet processing unit 22 transfers the INVITE request packet to the SIP server 2a. The packet processing unit 22 also transfers, for example, an INVITE response (200OK) packet, a session establishment acknowledgment (ACK) packet, and a session termination (BYE) packet.

The packet processing unit 22 also processes a packet related to media processing (RTP) between CPU1 and the APL 30b. The packet processing unit 22 transfers a packet of media data, such as voice data, between each telephone set (transmitter) 4 and the media server 2b (receiver) after session establishment based on SIP.

The event capture unit 23 captures a phenomenon of occurrence of an event which is registered in advance as an event of a Kernel process of executing a service requiring low delay. When an event of a packet process occurs at a point registered in advance, the event capture unit 23 notifies the event processing unit 24 of the occurrence of the event.

The present embodiment uses, for example, a kprobe (Kernel Probes), and sets, as a point, udp_rcv that is a UDP layer function and registers in advance a reservation of a process to be performed on the occurrence of an event of a packet process.

If a captured event is an event of a signal requesting session establishment, the event processing unit 24 preliminarily grasps a start of a service and acquires a receiver and a session ID of the service as information on session establishment from the control signal. If the captured event is an event of a signal requesting session termination, the event processing unit 24 grasps termination of a service and acquires a receiver and a session ID of the service as information on session termination from the control signal.

The event processing unit 24 is composed of, for example, eBPF (extended Berkeley Packet Filter) bytecode. eBPF refers to a program which is created in a user space, is fed into the kernel, and operates inside the kernel. The event processing unit 24 executes a code which analyzes a signal and, if a result of the analysis indicates a signal of a process determined in advance, notifies a subsequent unit of information necessary for the subsequent unit. Specifically, if a signal of a captured event indicates an "SIP processing signal" AND "ACK" when a notification signal from the event capture unit 23 arrives, the event processing unit 24 notifies the session state management unit 31 of "ACK", a "receiver", and a "session ID".

If a signal of a captured event indicates an "SIP processing signal" AND "200OK in response to BYE" when a notification signal from the event capture unit 23 arrives, the event processing unit 24 notifies the session state management unit 31 of "200OK in response to BYE", a "receiver", and a "session ID".

When a notification signal from the frequency check unit 32 arrives, the check command execution unit 25 checks a current operating frequency of a target CPU designated by the notification signal and notifies the frequency check unit 32 of the current operating frequency. The check command execution unit 25 is composed of, for example, CPUfreq-info.

When a notification signal from the frequency change unit 33 arrives, the change command execution unit 26 changes an operating frequency of a target CPU designated by the notification signal. The change command execution unit 26 is composed of, for example, CPUfreq-set.

The session state management unit 31 records a session ID of a service in question in a session state management book 34 for a receiver of the service and notifies the operating frequency change unit 12 of an instruction to make an operating frequency of a CPU as a target to be controlled higher if the session state management unit 31 acquires information on session establishment.

The session state management unit 31 deletes a session ID of a service in question from the session state management book 34 for a receiver of the service if the session state management unit 31 acquires information on session termination. Additionally, if all session IDs are deleted from the session state management book 34 for the receiver of the service, the session state management unit 31 notifies the operating frequency change unit 12 of an instruction to make the operating frequency of the target CPU lower.

The session state management book 34 holds a session ID. The held session ID refers to a session ID of a session which is established with the media server 2b.

The session state management unit 31 updates the session state management book 34 for the media server 2b when a notification signal from the event processing unit 24 arrives. Specifically, the session state management unit 31 adds a session ID to the session state management book 34 if an SIP processing signal indicates "ACK" when the notification signal from the event processing unit 24 arrives. The session state management unit 31 deletes a session ID from the session state management book 34 if the SIP processing signal indicates "200OK in response to BYE" when the notification signal from the event processing unit 24 arrives.

Transmitters (the telephone sets 4) of a conference call and the session state management book 34 have the following relationship. That is, when the conference call starts, the number of session IDs increases in the session state management book 34. When a new participant joins the conference call during the conference call, the number of session IDs increases in the session state management book 34. When one participant leaves the conference call during the conference call, the number of session IDs decreases in the session state management book 34. When the conference call terminates, there are no session ID entries left in the session state management book 34.

If the session state management unit 31 refers to the updated session state management book 34 and determines that the number of session IDs has increased, the session state management unit 31 notifies the frequency check unit 32 of an instruction to make an operating frequency of a CPU of a receiver of a conference call higher. Specifically, the session state management unit 31 notifies the frequency check unit 32 of information on the receiver and a high frequency flag.

If the session state management unit 31 refers to the updated session state management book 34 and determines that there are no session ID entries left, the session state management unit 31 notifies the frequency check unit 32 of an instruction to make the operating frequency of the CPU of the receiver of the conference call lower. Specifically, the session state management unit 31 notifies the frequency check unit 32 of information on the receiver and a low frequency flag.

The information on the receiver here refers to identification information on the media server 2b. The high frequency flag means making an operating frequency of a CPU as a target to be controlled higher and is information paired with the low frequency flag. The high frequency flag may be set to "H", and the low frequency flag may be set to "L". Alternatively, the high frequency flag may be set to "1", and the low frequency flag may be set to "0".

If the frequency check unit 32 receives an instruction to change an operating frequency of the target CPU from the preliminary grasp unit 11, the frequency check unit 32 checks a current operating frequency of the CPU. The frequency check unit 32 notifies the check command execution unit 25 of a frequency check request. That is, the frequency check unit 32 requests the check command execution unit 25 to check the current operating frequency of the CPU. When the frequency check unit 32 receives the current operating frequency from the check command execution unit 25, the frequency check unit 32 notifies a subsequent unit of the current operating frequency together with information necessary for the subsequent unit.

The frequency check unit 32 identifies a CPU which is allocated to a receiver on the basis of a CPU allocation table 35 when a notification signal from the session state management unit 31 arrives. The CPU allocation table 35 is a correspondence table of CPU cores allocated to respective application programs. In the present embodiment, CPU1 is allocated to the media server 2b that is a receiver. The frequency check unit 32 causes the check command execution unit 25 to execute a command to check a current operating frequency for a CPU (CPU1) under control. The frequency check unit 32 receives the current operating frequency of the CPU (CPU1) as a target to be controlled, from the check command execution unit 25.

The frequency check unit 32 notifies the frequency change unit 33 of information on the target CPU, the current operating frequency, and the high frequency flag if the number of session IDs increases, i.e., if notification of the high frequency flag is given.

The frequency check unit 32 notifies the frequency change unit 33 of the information on the target CPU, the current operating frequency, and the low frequency flag if there are no session ID entries left, i.e., if notification of the low frequency flag is given.

The frequency change unit 33 changes an operating frequency of the target CPU in accordance with a result of comparing the current operating frequency of the CPU with a predetermined prescribed value.

The frequency change unit 33 makes the operating frequency of the target CPU higher if the frequency change unit 33 receives an instruction to make the operating frequency of the CPU higher from the preliminary grasp unit 11, and the current operating frequency of the CPU is less than the prescribed value.

The frequency change unit 33 makes the operating frequency of the target CPU lower if the frequency change unit 33 receives an instruction to make the operating frequency of the CPU lower from the preliminary grasp unit 11, and the current operating frequency of the CPU is more than the prescribed value.

The frequency change unit 33 performs the determination processing below and checks whether it is necessary to change the operating frequency of the target CPU, on the basis of information, notification of which is given, when a notification signal from the frequency check unit 32 arrives.

The frequency change unit 33 determines that it is necessary to make the operating frequency of the target CPU higher in a case where a service requiring low delay is to be started. The case where a service requiring low delay is to be started refers to a case where notification of the high frequency flag is given and the current operating frequency of the CPU is less than the prescribed value.

The frequency change unit 33 determines that it is necessary to make the operating frequency of the target CPU lower in a case where a service requiring low delay has terminated. The case where a service requiring low delay has terminated refers to a case where notification of the low frequency flag is given and the current operating frequency of the CPU is more than the prescribed value.

If no service requiring low delay is to be started, and no service requiring low delay has terminated, the frequency change unit 33 determines that it is not necessary to change the operating frequency of the target CPU.

The frequency change unit 33 requests the change command execution unit 26 to change the operating frequency of the target CPU if it is necessary to change the operating frequency of the CPU.

Control Method

Figure 4:
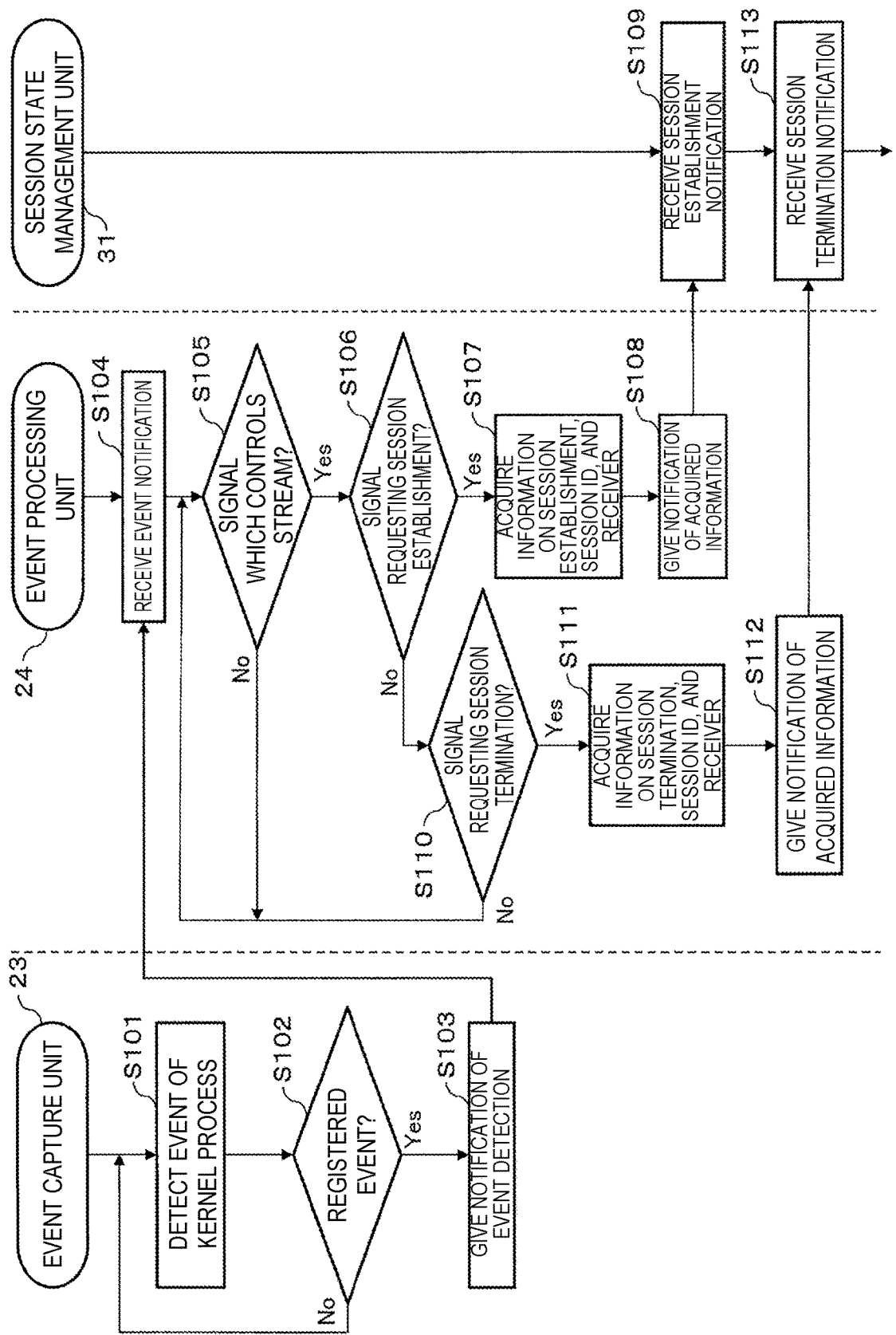
FIG. 4 is a sequence chart showing the flow of a process of grasping a session state by the in-server frequency control apparatus according to the first embodiment of the present invention.

A control method for the in-server frequency control apparatus 10 will be described with reference to FIGS. 4 to 6 (and appropriate reference to FIG. 3). As shown in FIG. 4, when the event capture unit 23 detects an event of a Kernel process (step S101), the event capture unit 23 returns to step S101 if the detected event is not a registered event (No in step S102). On the other hand, if the detected event is a registered event (Yes in step S102), the event capture unit 23 notifies the event processing unit 24 of detection of an event registered in advance (step S103).

The event processing unit 24 receives an event notification signal of the event from the event capture unit 23 (step S104). The event processing unit 24 analyzes whether a packet signal of the captured event is a signal which controls a stream (step S105). The event processing unit 24, for example, determines that the packet signal is a signal which controls a stream (Yes in step S105) and that the control signal is a signal requesting session establishment (Yes in step S106). In this case, the event processing unit 24 acquires respective pieces of information on session establishment, a session ID, and the receiver from the control signal (step S107). The event processing unit 24 notifies the session state management unit 31 of the acquired pieces of information (step S108). The session state management unit 31 receives session establishment notification (step S109). Note that processes of the session state management unit 31 subsequent to step S109 will be described with reference to a sequence chart in FIG. 5.

As shown in FIG. 4, the event processing unit 24, for example, determines that the control signal is not a signal requesting session establishment (No in step S106) and is a signal requesting session termination (Yes in step S110). In this case, the event processing unit 24 acquires respective pieces of information on session termination, a session ID, and the receiver from the control signal (step S111). The event processing unit 24 notifies the session state management unit 31 of the acquired pieces of information (step S112). The session state management unit 31 receives session termination notification (step S113). Note that processes of the session state management unit 31 subsequent to step S113 will be described with reference to a sequence chart in FIG. 6.

If the control signal is not a signal requesting session establishment or session termination (No in step S110), as shown in FIG. 4, the event processing unit 24 returns to step S105. If the packet signal is not a signal which controls a stream in step S105 (No in step S105), the event processing unit 24 returns to step S105.

The processes of the session state management unit 31 subsequent to step S109 above will be described.

Figure 5:
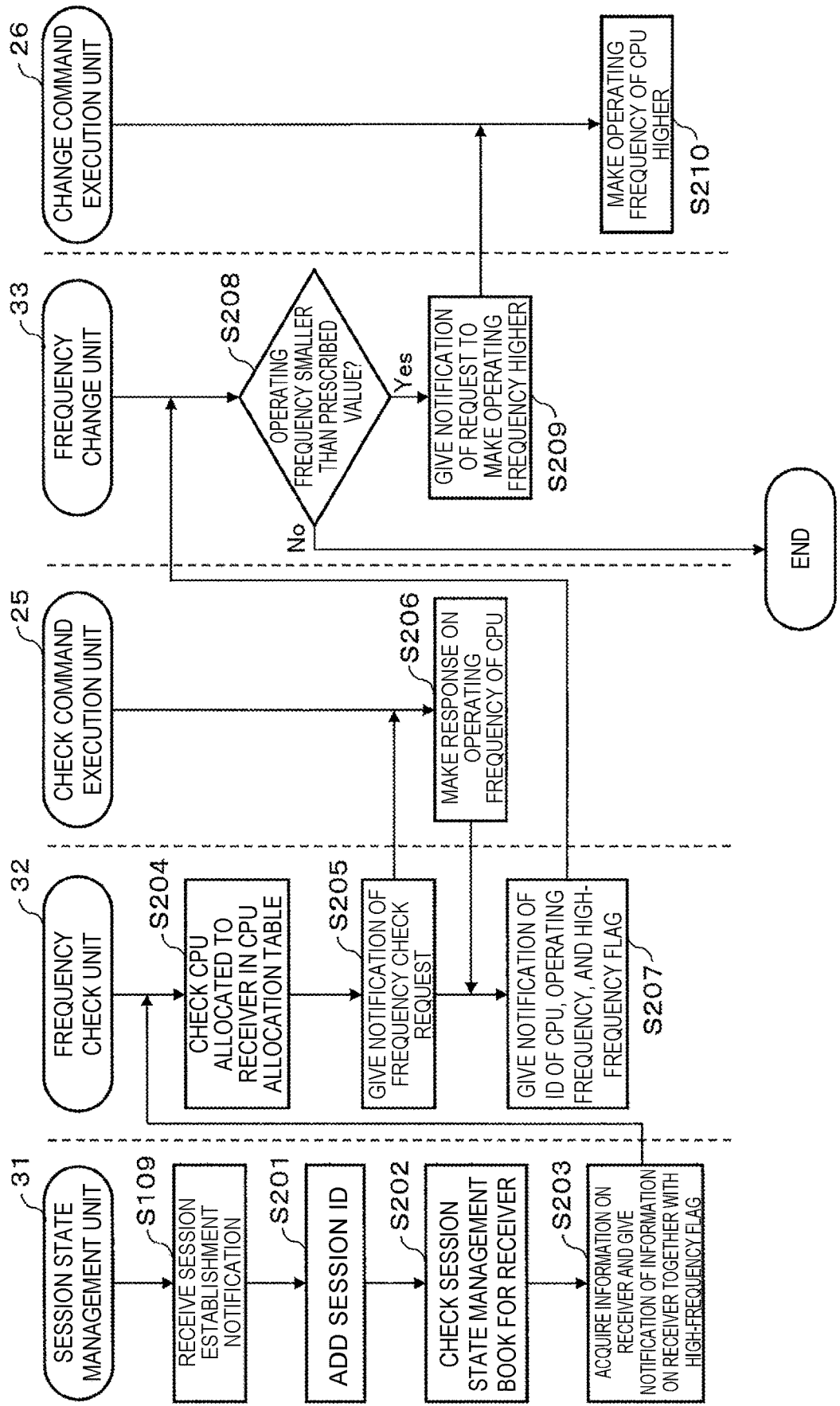
FIG. 5 is a sequence chart showing the flow of a process after the in-server frequency control apparatus grasps session establishment.

If the session state management unit 31 receives the session establishment notification from the event processing unit 24 (step S109), as shown in FIG. 5, the session state management unit 31 adds the session ID to the session state management book 34 for the receiver (step S201). The session state management unit 31 checks that the number of session IDs has increased in the session state management book 34 for the receiver (step S202). The session state management unit 31 acquires the information on the receiver and notifies the frequency check unit 32 of the information on the receiver together with the high frequency flag (step S203).

The frequency check unit 32 acquires the information on the receiver when a notification signal from the session state management unit 31 arrives. The frequency check unit 32 checks a CPU which is allocated to the receiver in the CPU allocation table 35, on the basis of the information on the receiver (step S204). In this example, the frequency check unit 32 checks that the CPU allocated to the receiver is CPU'. The frequency check unit 32 notifies the check command execution unit 25 of a frequency check request (step S205). The check command execution unit 25 checks the current operating frequency of the target CPU and makes a response on the current operating frequency of the target CPU (step S206). The frequency check unit 32 receives the current operating frequency of the target CPU and notifies the frequency change unit 33 of an ID of the target CPU, the current operating frequency, and the high frequency flag (step S207).

The frequency change unit 33, for example, receives the high frequency flag and determines that the current operating frequency of the target CPU is not less than the prescribed value (No in step S208). In this case, the frequency change unit 33 terminates the process. The frequency change unit 33, for example, receives the high frequency flag and determines that the current operating frequency of the target CPU is less than the prescribed value (Yes in step S208). In this case, the frequency change unit 33 notifies the change command execution unit 26 of a request to make the operating frequency of the target CPU higher (step S209). The change command execution unit 26 makes the operating frequency of the target CPU higher (step S210). Thus, the above-described processes make it possible to make the operating frequency of CPU1 allocated to the media server 2b higher and provide a low-delay service when a session is established.

The processes of the session state management unit 31 subsequent to step S113 above will be described.

Figure 6:
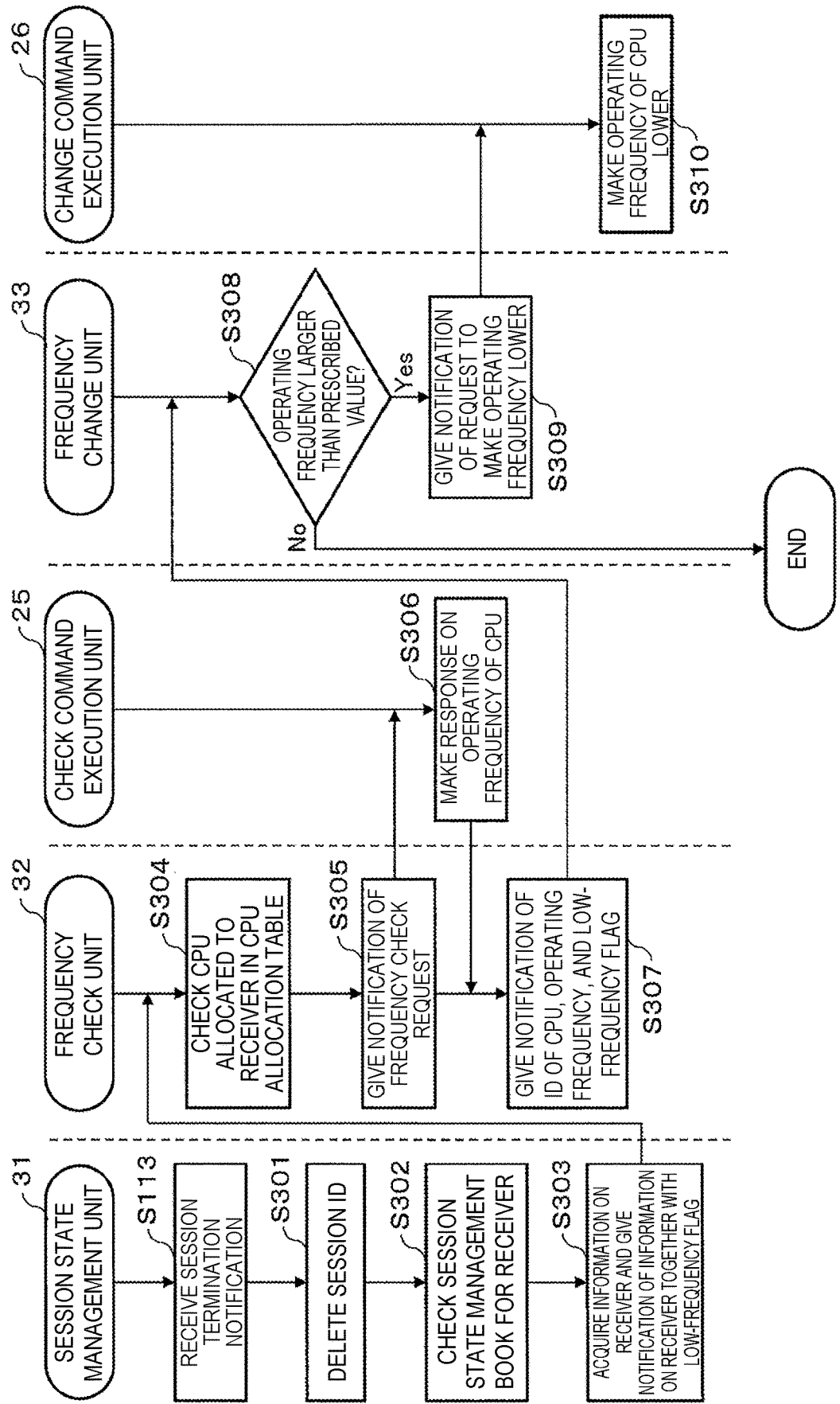
FIG. 6 is a sequence chart showing the flow of a process after the in-server frequency control apparatus grasps session termination.

If the session state management unit 31 receives the session termination notification from the event processing unit 24 (step S113), as shown in FIG. 6, the session state management unit 31 deletes the session ID from the session state management book 34 for the receiver (step S301). The session state management unit 31 checks the updated session state management book 34 for the receiver (step S302). The session state management unit 31 makes an end of subsequent processing if the session state management unit 31 determines that there is any session ID entry left. The session state management unit 31 acquires the information on the receiver and notifies the frequency check unit 32 of the information on the receiver together with the low frequency flag (step S303) if the session state management unit 31 determines that there are no session ID entries left.

The frequency check unit 32 acquires the information on the receiver when a notification signal from the session state management unit 31 arrives. The frequency check unit 32 then checks a CPU which is allocated to the receiver in the CPU allocation table 35, on the basis of the information on the receiver (step S304). In this example, the frequency check unit 32 checks that the CPU allocated to the receiver is CPU'. The frequency check unit 32 notifies the check command execution unit 25 of a frequency check request (step S305). The check command execution unit 25 checks the current operating frequency of the target CPU and makes a response on the current operating frequency of the target CPU (step S306). The frequency check unit 32 receives the current operating frequency of the target CPU and notifies the frequency change unit 33 of the ID of the target CPU, the current operating frequency, and the low frequency flag (step S307).

The frequency change unit 33, for example, receives the low frequency flag and determines that the current operating frequency of the target CPU is not more than the prescribed value (No in step S308). In this case, the frequency change unit 33 terminates the process. The frequency change unit 33, for example, receives the low frequency flag and determines that the current operating frequency of the target CPU is more than the prescribed value (Yes in step S308). In this case, the frequency change unit 33 notifies the change command execution unit 26 of a request to make the operating frequency of the target CPU lower (step S309). The change command execution unit 26 makes the operating frequency of the target CPU lower (step S310). Thus, the above-described processes make it possible to make the operating frequency of CPU1 allocated to the media server 2b lower and reduce power consumption when a session has terminated.

Second Embodiment

A conference call system including an in-server frequency control apparatus 10B according to a second embodiment will be described with reference to FIG. 7. Note that same components as those shown in FIG. 3 are denoted by same reference characters and that a description thereof will be omitted below. The in-server frequency control apparatus 10B includes a preliminary grasp unit 11B and an operating frequency change unit 12. The preliminary grasp unit 11B includes, for example, a reservation status management unit 36. The operating frequency change unit 12 includes, for example, a frequency check unit 32, a check command execution unit 25, a frequency change unit 33, and a change command execution unit 26. Here, an OS 21B includes, as processing functions of a kernel, a packet processing unit 22, the check command execution unit 25, and the change command execution unit 26. The reservation status management unit 36 corresponds to the APL 30 in FIG. 2 and operates on the OS 21B. Details of the units will be described below.

The reservation status management unit 36 monitors a reservation scheduler and senses scheduled start information on a reserved service and termination information on the service. If the reservation status management unit 36 acquires scheduled start information on a service before the service starts, the reservation status management unit 36 preliminarily grasps a start of the service and records a transmitter of the service in a reservation status management book 37 for a receiver of the service. In this case, the reservation status management unit 36 notifies the operating frequency change unit 12 of an instruction to make an operating frequency of a CPU as a target to be controlled higher. If the reservation status management unit 36 acquires termination information on the service after the service terminates, the reservation status management unit 36 grasps the termination of the service and deletes the transmitter of the service from the reservation status management book 37. If all transmitters are deleted from the reservation status management book 37, the reservation status management unit 36 notifies the operating frequency change unit 12 of an instruction to make the operating frequency of the target CPU lower.

In the present embodiment, the reservation status management unit 36 monitors an APL 30c functioning as a reservation scheduler at predetermined time intervals (e.g., one-minute intervals). For example, if the reservation status management unit 36 accesses the APL 30c at one-minute intervals, the reservation status management unit 36 can sense a scheduled start of a conference call one minute before a start time of the conference call and sense termination of the conference call by one minute after a termination time of the conference call.

The reservation status management book 37 holds information on a transmitter of a conference call. The held information on the transmitter refers to identification information on the transmitter, a session with a media server 2b for which is to be established. Scheduled start information on a service is, for example, scheduled conference start information on a conference call. The scheduled conference start information is information on a receiver (the media server 2b), a transmitter (a telephone set 4), and a start time of the conference call. Termination information on a service is, for example, conference termination information on a conference call. The conference termination information is, for example, information on a receiver of the conference call, a transmitter, and a termination time of the conference call.

The reservation status management unit 36 updates the reservation status management book 37 for the media server 2b when the reservation status management unit 36 acquires scheduled conference start information or conference termination information from the reservation scheduler. Specifically, when the reservation status management unit 36 acquires scheduled conference start information from the reservation scheduler, the reservation status management unit 36 adds a transmitter to the reservation status management book 37 for the receiver a predetermined time (e.g., one minute) before a start time. If the reservation status management unit 36 acquires conference termination information from the reservation scheduler, the reservation status management unit 36 deletes a transmitter from the reservation status management book 37 for the receiver a predetermined time (e.g., one minute) after a termination time.

Transmitters (the telephone sets 4) of a conference call and the reservation status management book 37 have the following relationship. That is, when the conference call starts, the number of transmitters increases in the reservation status management book 37. When a new participant joins the conference call during the conference call, the number of transmitters increases in the reservation status management book 37. When one participant leaves the conference call during the conference call, the number of transmitters decreases in the reservation status management book 37. When the conference call terminates, there are no transmitter entries left in the reservation status management book 37.

If the reservation status management unit 36 refers to the updated reservation status management book 37 and determines that the number of transmitters has increased, the reservation status management unit 36 notifies the frequency check unit 32 of an instruction to make an operating frequency of a CPU of the receiver of a conference call higher. Specifically, the reservation status management unit 36 notifies the frequency check unit 32 of information on the receiver and a high frequency flag.

If the reservation status management unit 36 refers to the updated reservation status management book 37 and determines that there are no transmitter entries left, the reservation status management unit 36 notifies the frequency check unit 32 of an instruction to make the operating frequency of the CPU of the receiver of the conference call higher. Specifically, the reservation status management unit 36 notifies the frequency check unit 32 of information on the receiver and a low frequency flag.

The information on the receiver here refers to identification information on the media server 2b.

[Control Method]

A control method for the in-server frequency control apparatus 10B will be described with reference to FIGS. 8 to 10 (and appropriate reference to FIG. 7). As shown in FIG. 8, the reservation status management unit 36 of the in-server frequency control apparatus 10B monitors the APL 30c as the reservation scheduler at, for example, one-minute intervals (step S401). The reservation status management unit 36 determines whether there is any conference that is scheduled to start a predetermined time later (step S402). For example, the reservation status management unit 36 determines whether there is any conference that is scheduled to start within one minute from a current time. If there is any conference scheduled to start (Yes in step S402), the reservation status management unit 36 acquires scheduled conference start information on the conference (step S403). That is, the reservation status management unit 36 acquires, as the scheduled conference start information, the receiver, a transmitter, and a conference call start time from the APL 30c as the reservation scheduler. Note that processes of the reservation status management unit 36 subsequent to step S403 will be described with reference to a sequence chart in FIG. 9.

If there is no conference scheduled to start (No in step S402), the reservation status management unit 36 determines whether there is any conference terminated a predetermined time earlier (step S404). For example, the reservation status management unit 36 determines whether there is any conference call terminated within one minute from the current time. If there is any terminated conference (Yes in step S404), the reservation status management unit 36 acquires conference termination information on the conference (step S405). That is, the reservation status management unit 36 acquires, as the conference termination information, the receiver, a transmitter, and a conference call termination time from the APL 30c as the reservation scheduler. Processes of the reservation status management unit 36 subsequent to step S405 will be described with reference to a sequence chart in FIG. 10. Note that, if there is no conference terminated the predetermined time earlier (No in step S404), as shown in FIG. 8, the reservation status management unit 36 returns to step S401.

The processes of the reservation status management unit 36 subsequent to step S403 above will be described.

Figure 9:
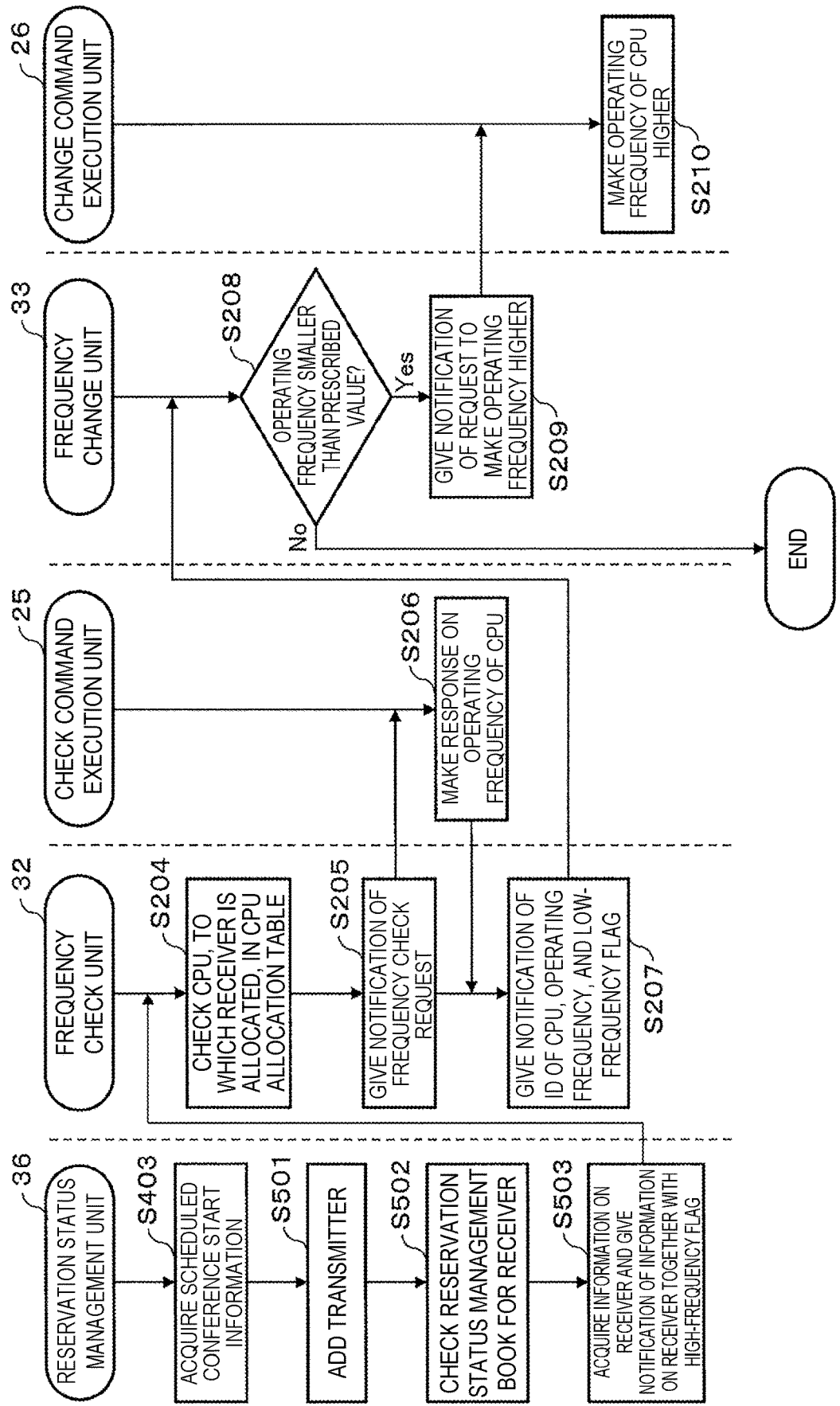
FIG. 9 is a sequence chart showing the flow of a process after the in-server frequency control apparatus grasps a scheduled conference start.

As shown in FIG. 9, if the reservation status management unit 36 acquires scheduled conference start information from the scheduler (step S403), the reservation status management unit 36 adds a transmitter to the reservation status management book 37 for the receiver (step S501). The reservation status management unit 36 checks that the number of transmitters has increased in the reservation status management book 37 for the receiver (step S502). The reservation status management unit 36 acquires information on the receiver and notifies the frequency check unit 32 of the information on the receiver together with the high frequency flag (step S503). Since processes in steps S204 to S210 subsequent to step S503 are the same as steps S204 to S210 shown in FIG. 5, a description thereof will be omitted. Thus, the above-described processes allow the in-server frequency control apparatus 10B to make an operating frequency of CPU1 allocated to the media server 2b higher and provide a low-delay service when the in-server frequency control apparatus 10B acquires scheduled conference start information from the scheduler.

The processes of the reservation status management unit 36 subsequent to step S405 above will be described.

Figure 10:
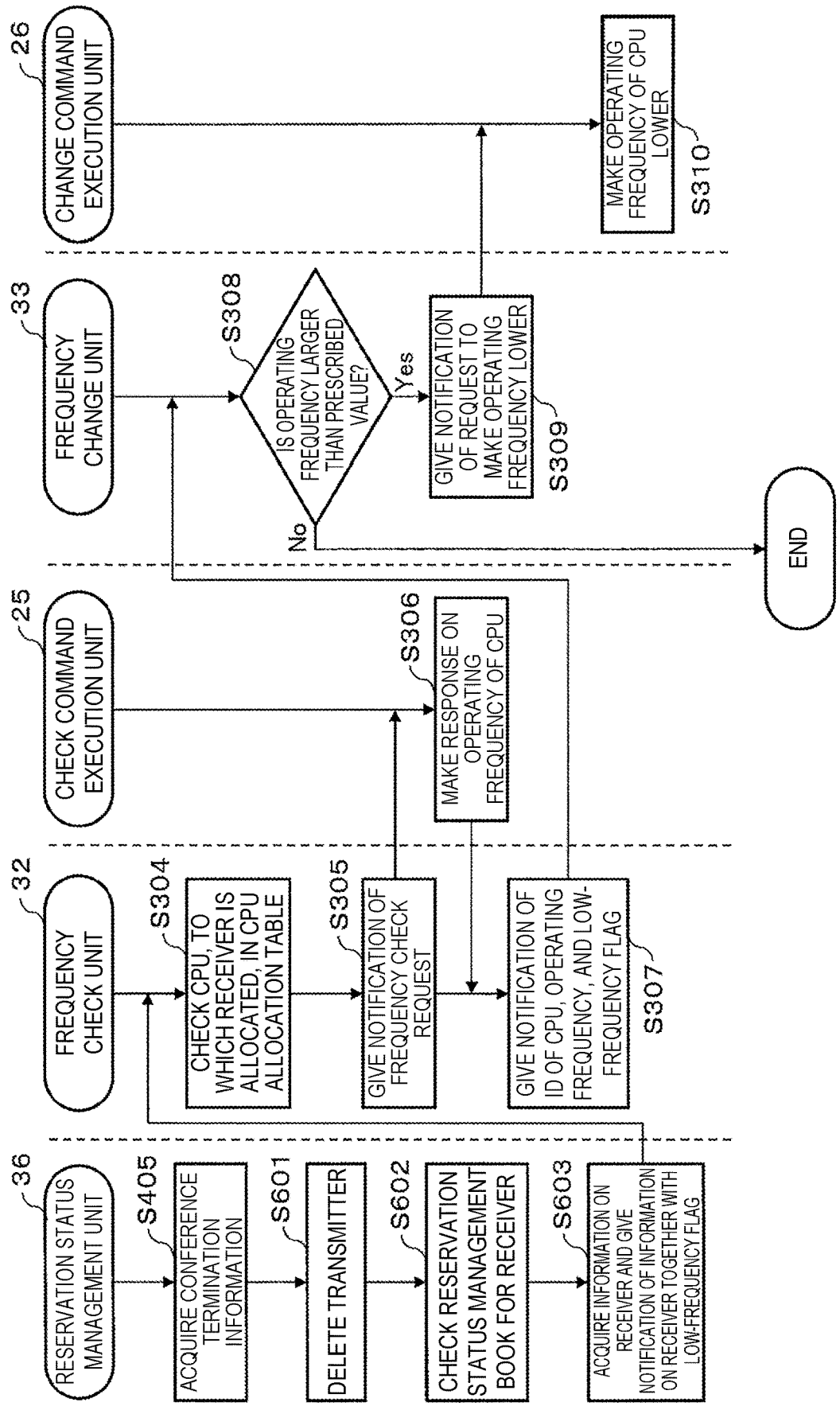
FIG. 10 is a sequence chart showing the flow of a process after the in-server frequency control apparatus grasps conference termination.

As shown in FIG. 10, when the reservation status management unit 36 acquires conference termination information from the scheduler (step S405), the reservation status management unit 36 deletes a transmitter from the reservation status management book 37 for the receiver (step S601). The reservation status management unit 36 checks the updated reservation status management book 37 for the receiver (step S602). The reservation status management unit 36 terminates subsequent processing if the reservation status management unit 36 determines that there is any transmitter entry left. The reservation status management unit 36 acquires information on the receiver and notifies the frequency check unit 32 of the information on the receiver together with the low frequency flag (step S603) if the reservation status management unit 36 determines that there are no transmitter entries left. Since processes in steps S304 to S310 subsequent to step S603 are the same as in steps S304 to S310 shown in FIG. 6, a description thereof will be omitted. Thus, the above-described processes allow the in-server frequency control apparatus 10B to make the operating frequency of CPU1 allocated to the media server 2b lower and reduce power consumption when a conference call terminates.

Modification

Although the in-server frequency control apparatus 10B according to the second embodiment is configured such that the reservation status management unit 36 monitors a reservation scheduler, the present invention is not limited to this. The reservation status management unit 36 may be configured to receive notification of scheduled start information on a reserved service and termination information on the service from a reservation scheduler each time a reservation update is made.

Figure 11:
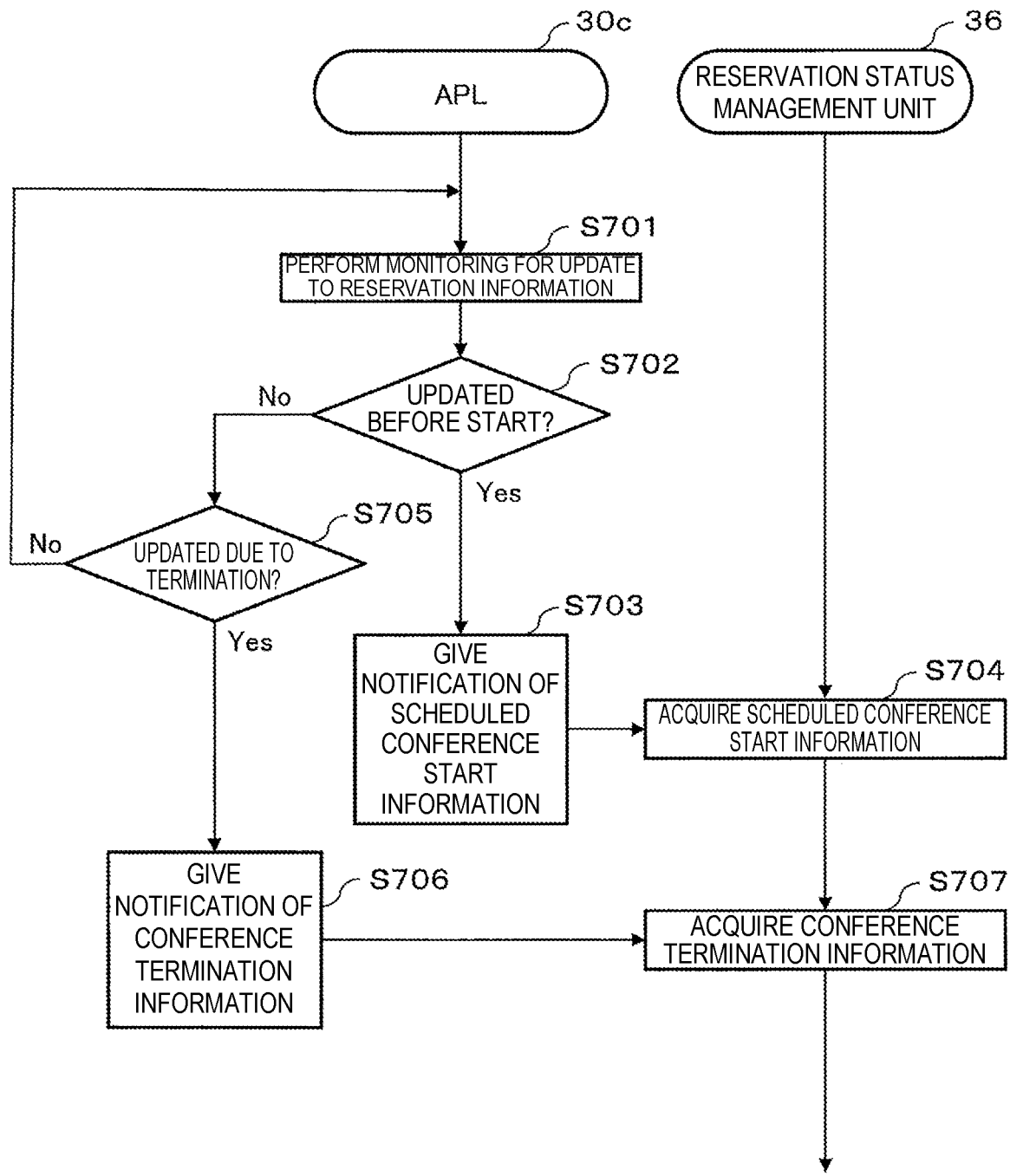
FIG. 11 is a sequence chart showing a modification of the process of grasping a conference reservation status by the in-server frequency control apparatus according to the second embodiment of the present invention.

In the case of the modification, as shown in FIG. 11, the APL 30c as the reservation scheduler performs monitoring for an update to reservation information (step S701). The APL 30c as the reservation scheduler determines whether there is any reservation information updated before a start of a conference (step S702). If there is any reservation information updated before a start of a conference (Yes in step S702), the APL 30c as the reservation scheduler notifies the reservation status management unit 36 of scheduled conference start information (step S703). Specifically, the APL 30c as the reservation scheduler notifies the reservation status management unit 36 of a receiver, a transmitter, and a conference start time as the scheduled conference start information.

With the above-described notification, the reservation status management unit 36 according to the modification acquires the scheduled conference start information (step S704). Since processes to be performed by the reservation status management unit 36 after step S704 are the same as those in steps S501 to S503 shown in FIG. 9, a description thereof will be omitted. The processes in steps S204 to S210 subsequent to step S503 are the same as in steps S204 to S210 shown in FIG. 5, and a description thereof will be omitted. Thus, the above-described processes allow the in-server frequency control apparatus 10B to make an operating frequency of CPU1 allocated to the media server 2b higher and provide a low-delay service when the in-server frequency control apparatus 10B acquires scheduled conference start information from the scheduler.

As shown in FIG. 11, if there is no reservation information updated before a start of a conference (No in step S702), the APL 30c as the reservation scheduler determines whether there is any information updated due to conference termination (step S705). If there is no information updated due to conference termination (No in step S705), the APL 30c as the reservation scheduler returns to step S701. On the other hand, if there is any information updated due to conference termination (Yes in step S705), the APL 30c as the reservation scheduler notifies the reservation status management unit 36 of conference termination information (step S706). Specifically, the APL 30c as the reservation scheduler notifies the reservation status management unit 36 of a receiver, a transmitter, and a conference termination time as the conference termination information.

With the above-described notification, the reservation status management unit 36 according to the modification acquires the conference termination information (step S707). Since processes to be performed by the reservation status management unit 36 after step S707 are the same as those in steps S601 to S603 shown in FIG. 10, a description thereof will be omitted. The processes in steps S304 to S310 subsequent to step S603 are the same as in steps S304 to S310 shown in FIG. 6, and a description thereof will be omitted. Thus, the above-described processes allow the in-server frequency control apparatus 10B to make the operating frequency of CPU1 allocated to the media server 2b lower and reduce power consumption when a conference call terminates.

Hardware Configuration

Figure 12:
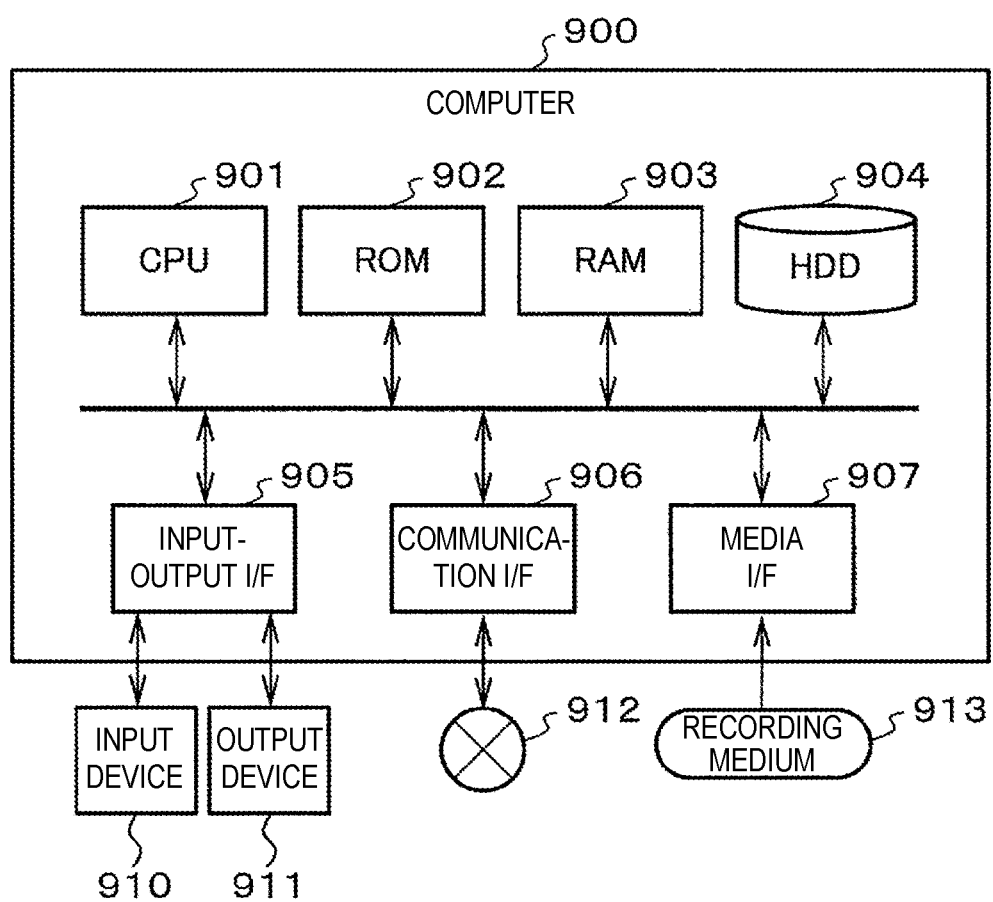
FIG. 12 is a hardware configuration diagram showing an example of a computer which implements functions of an in-server frequency control apparatus according to an embodiment of the present invention.

The in-server frequency control apparatus 10 according to the present embodiment is implemented by, for example, a computer 900 having a configuration as shown in FIG. 12.

FIG. 12 is a hardware configuration diagram showing an example of the computer 900 that implements functions of the in-server frequency control apparatus 10 according to the present embodiment. The computer 900 has a CPU (Central Processing Unit) 901, a ROM (Read Only Memory) 902, a RAM (Random Access Memory) 903, an HDD (Hard Disk Drive) 904, an input-output I/F (Interface) 905, a communication I/F 906, and a media I/F 907.

The CPU 901 works on the basis of a program which is stored in the ROM 902 or the HDD 904 and performs control by a control unit (the preliminary grasp unit 11 and the operating frequency change unit 12 shown in FIG. 3). The ROM 902 stores a boot program which is executed by the CPU 901 at the time of startup of the computer 900, a program related to hardware of the computer 900, and the like.

The CPU 901 controls an input device 910, such as a mouse or a keyboard, and an output device 911, such as a display or a printer, via the input-output I/F 905. The CPU 901 acquires data from the input device 910 and outputs generated data to the output device 911, via the input-output I/F 905. Note that, as a processor, a GPU (Graphics Processing Unit) or the like may be used together with the CPU 901.

The HDD 904 stores a program to be executed by the CPU 901, data to be used by the program, and the like. The communication I/F 906 receives data from a different apparatus via a communication network 912 and outputs the data to the CPU 901 or transmits data generated by the CPU 901 to a different apparatus via the communication network 912.

The media I/F 907 reads a program or data stored in a recording medium 913 and outputs the program or data to the CPU 901 via the RAM 903. The CPU 901 loads a program related to a target process from the recording medium 913 into the RAM 903 via the media I/F 907 and executes the loaded program. The recording medium 913 is an optical recording medium, such as a DVD (Digital Versatile Disc) or a PD (Phase change rewritable Disk), a magneto-optical recording medium, such as an MO (Magneto Optical disk), a magnetic recording medium, a conductor memory tape medium, a semiconductor memory, or the like.

For example, if the computer 900 functions as the in-server frequency control apparatus 10 according to the embodiment, the CPU 901 implements the functions of the in-server frequency control apparatus 10 by executing a program which is loaded into the RAM 903. Data in the RAM 903 is stored in the HDD 904. The CPU 901 reads a program related to a target process from the recording medium 913 and executes the program. Additionally, the CPU 901 may read the program related to the target process from a different apparatus via the communication network 912.

Figure 7:
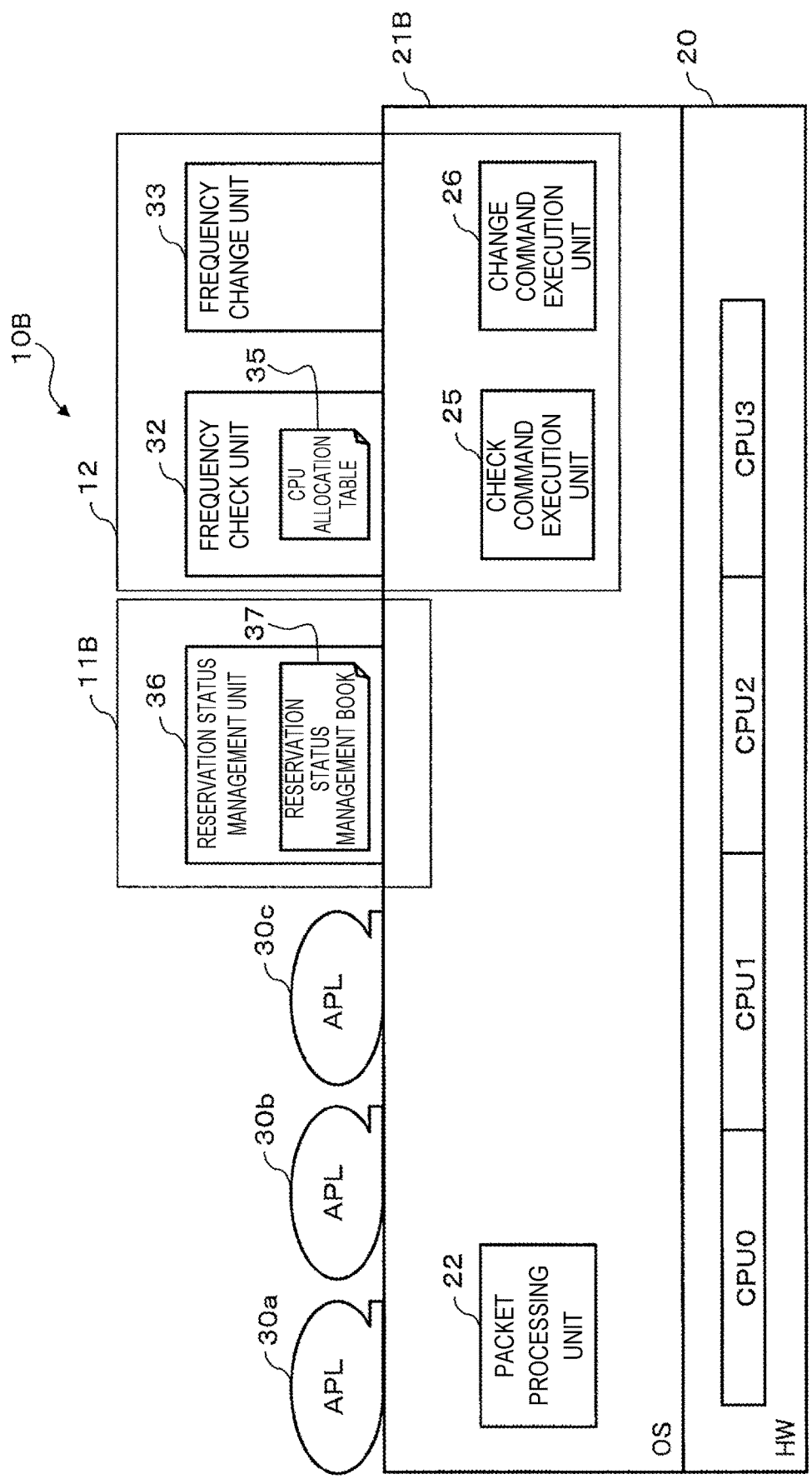
FIG. 7 is a configuration diagram of an in-server frequency control apparatus according to a second embodiment of the present invention.
Figure 8:
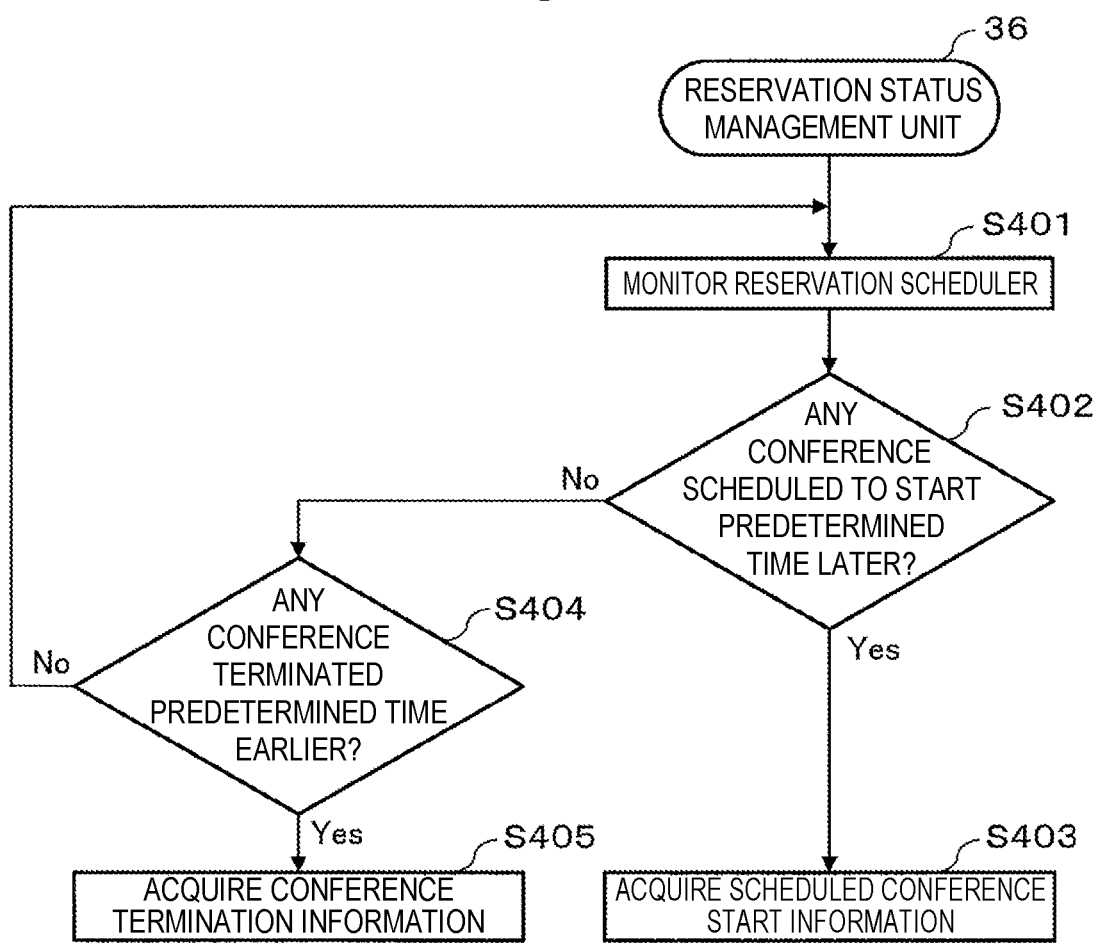
FIG. 8 is a flowchart showing the flow of a process of grasping a conference reservation status by the in-server frequency control apparatus according to the second embodiment of the present invention.

When the computer 900 functions as the in-server frequency control apparatus 10B according to the embodiment, the CPU 901 works similarly on the basis of, for example, a program which is stored in the ROM 902 or the HDD 904 and performs control by a control unit (the preliminary grasp unit 11B and the operating frequency change unit 12 shown in FIG. 7).

Advantageous Effects

As has been described above, the in-server frequency control apparatus 10 includes the preliminary grasp unit 11 that preliminarily grasps a start of a service requiring low delay in a server and grasps termination of the service by a predetermined method and the operating frequency change unit 12 that changes an operating frequency of a CPU as a target to be controlled, which is a CPU allocated in advance to a receiver of the service in the server, at the time of the preliminarily grasped start of the service and at the time of the termination of the service, and the operating frequency change unit 12 makes the operating frequency of the target CPU higher than a predetermined value at the time of the start of the service and makes the operating frequency of the target CPU lower than the predetermined value at the time of the termination of the service.

With the above-described configuration, the in-server frequency control apparatus 10 can grasp a time period requiring low delay in the server and a time period not requiring low delay. Since the in-server frequency control apparatus 10 sets an operating frequency of a CPU allocated to a receiver of a service requiring low delay higher at the time of a start of the service, the in-server frequency control apparatus 10 can provide a service with low delay. Additionally, since the in-server frequency control apparatus 10 sets the operating frequency of the CPU allocated to the receiver of the service requiring low delay lower at the time of termination of the service, the in-server frequency control apparatus 10 can reduce power consumption. Thus, the in-server frequency control apparatus 10 has an effect of achieving both low delay and power saving.

In the in-server frequency control apparatus 10, the preliminary grasp unit 11 includes the event capture unit 23 that performs, as the predetermined method, capturing a phenomenon of occurrence of an event which is registered in advance as an event of a Kernel process of executing a service requiring low delay, the event processing unit 24 that preliminarily grasps a start of a service and acquires a receiver and a session ID of the service as information on session establishment from a control signal requesting session establishment if a captured event is an event of the control signal and grasps termination of a service and acquires a receiver and a session ID of the service as information on session termination from a control signal requesting session termination if the captured event is an event of the control signal, and the session state management unit 31 that records a session ID of a service in question in the session state management book 34 for a receiver of the service and notifies the operating frequency change unit 12 of an instruction to make an operating frequency of a CPU under control higher if the session state management unit 31 acquires information on session establishment, and deletes a session ID of a service in question from the session state management book 34 if the session state management unit 31 acquires information on session termination and notifies the operating frequency change unit 12 of an instruction to make the operating frequency of the CPU as a target to be controlled lower if all session IDS are deleted from the session state management book 34.

With the above-described configuration, the in-server frequency control apparatus 10 captures an event of a process of controlling a stream and analyzes a session control signal at the time of occurrence of an event. If the in-server frequency control apparatus 10 grasps the fact that a service requiring low delay is to start from a result of the analysis, the in-server frequency control apparatus 10 can preliminarily set an operating frequency of a CPU allocated to a receiver of the service higher. If the in-server frequency control apparatus 10 grasps the fact that the service requiring low delay is to terminate, the in-server frequency control apparatus 10 can make the operating frequency of the CPU allocated to the receiver of the service lower.

In the in-server frequency control apparatus 10B, the preliminary grasp unit 11B includes the reservation status management unit 36 that performs, as the predetermined method, monitoring a reservation scheduler which performs a process of reserving a service requiring low delay and sensing scheduled start information on a reserved service and termination information on the service, and the reservation status management unit 36 preliminarily grasps a start of a service, records a transmitter of the service in the reservation status management book 37 for a receiver of the service, and notifies the operating frequency change unit 12 of an instruction to make an operating frequency of a CPU as a target to be controlled higher if the reservation status management unit 36 acquires scheduled start information on the service before the service starts, and grasps termination of a service and deletes a transmitter of the service from the reservation status management book 37 if the reservation status management unit 36 acquires termination information on the service after the service terminates and notifies the operating frequency change unit 12 of an instruction to make the operating frequency of the target CPU lower if all transmitters are deleted from the reservation status management book 37.

With the above-described configuration, the in-server frequency control apparatus 10B senses scheduled start information on a reserved service and termination information on the service by monitoring the reservation scheduler. If the in-server frequency control apparatus 10B grasps the fact that a service requiring low delay is to start, the in-server frequency control apparatus 10B can preliminarily set an operating frequency of a CPU allocated to a receiver of the service higher. If the in-server frequency control apparatus 10B grasps the fact that the service requiring low delay is to terminate, the in-server frequency control apparatus 10B can make the operating frequency of the CPU allocated to the receiver of the service lower.

In the in-server frequency control apparatus 10B, the preliminary grasp unit 11B includes the reservation status management unit 36 that performs, as the predetermined method, receiving notification of scheduled start information on a reserved service and termination information on the service from the reservation scheduler that performs the process of reserving a service requiring low delay each time a reservation update is made, and the reservation status management unit 36 preliminarily grasps a start of a service, records a transmitter of the service in the reservation status management book 37 for a receiver of the service, and notifies the operating frequency change unit 12 of an instruction to make an operating frequency of a CPU as a target to be controlled higher if the reservation status management unit 36 acquires scheduled start information on the service before the service starts, and grasps termination of a service and deletes a transmitter of the service from the reservation status management book 37 if the reservation status management unit 36 acquires termination information on the service after the service terminates and notifies the operating frequency change unit 12 of an instruction to make the operating frequency of the target CPU lower if all transmitters are deleted from the reservation status management book 37.

With the above-described configuration, the in-server frequency control apparatus 10B senses scheduled start information on a reserved service and termination information on the service by receiving notification from the reservation scheduler each time a reservation update is made. If the in-server frequency control apparatus 10B grasps the fact that a service requiring low delay is to start, the in-server frequency control apparatus 10B can preliminarily set an operating frequency of a CPU allocated to a receiver of the service higher. If the in-server frequency control apparatus 10B grasps the fact that the service requiring low delay is to terminate, the in-server frequency control apparatus 10B can make the operating frequency of the CPU allocated to the receiver of the service lower.

In the in-server frequency control apparatus 10 or 10B, the operating frequency change unit 12 includes the frequency check unit 32 that checks a current operating frequency of a CPU as a target to be controlled if the frequency check unit 32 receives an instruction to change an operating frequency of the CPU from the preliminary grasp unit 11 or 11B and the frequency change unit 33 that changes the operating frequency of the target CPU in accordance with a result of comparing the current operating frequency of the CPU with a predetermined prescribed value, and the frequency change unit 33 makes the operating frequency of the target CPU higher if the frequency change unit 33 receives an instruction to make the operating frequency of the CPU higher, and the current operating frequency of the CPU is less than the prescribed value and makes the operating frequency of the target CPU lower if the frequency change unit 33 receives an instruction to make the operating frequency of the CPU lower, and the current operating frequency of the CPU is more than the prescribed value.

With the above-described configuration, the in-server frequency control apparatus 10 or 10B checks whether it is necessary to change an operating frequency of a CPU, on the basis of not only information preliminarily grasped by the preliminary grasp unit 11 or 11B but also a current operating frequency of the CPU. The in-server frequency control apparatus 10 or 10B can make the operating frequency of the target CPU higher if the in-server frequency control apparatus 10 or 10B grasps the fact that the current operating frequency of the CPU is low, and a time period requiring low delay is to come. The in-server frequency control apparatus 10 or 10B can make the operating frequency of the target CPU lower if the in-server frequency control apparatus 10 or 10B grasps the fact that the current operating frequency of the CPU is high, and it is a time period not requiring low delay.

Note that the present invention is not limited to the above-described embodiments and that many modifications can be made within the technical idea of the present invention by those skilled in the art. For example, an in-server frequency control apparatus can be applied to various services which need transferring of packets with low delay, besides media processing of a conference call. An in-server frequency control apparatus can be applied to various services which preliminarily manage a real-time stream using, e.g., a session control signal. An in-server frequency control apparatus can be applied to various services which each have a time period requiring low-delay processing and a time period not requiring low-delay processing. An in-server frequency control apparatus can provide a low-delay, low-power service by setting an operating frequency of a CPU higher in a time period requiring low-delay processing and setting the operating frequency of the CPU lower in a time period not requiring low-delay processing.

REFERENCE SIGNS LIST

1 Conference call system
2*a* SIP server
2*b* Media server
4 Telephone set
5 Conference call
6 Information terminal
10, 10B In-server frequency control apparatus
11 Preliminary grasp unit
12 Operating frequency change unit
20 HW
21, 21B OS
22 Packet processing unit
23 Event capture unit
24 Event processing unit
25 Check command execution unit 26 Change command execution unit
30a, 30b, 30c APL
31 Session state management unit
32 Frequency check unit
33 Frequency change unit
34 Session state management book
35 CPU allocation table
36 Reservation status management unit
37 Reservation status management book

The invention claimed is:

1. An in-server frequency control apparatus comprising:
a preliminary grasp unit, comprising at least one processor, configured to preliminarily grasp a start of a service requiring low delay in a server and grasp termination of the service by a predetermined method; and
an operating frequency change unit, comprising at least one processor, configured to change an operating frequency of a CPU as a target to be controlled, the target CPU being allocated in advance to a receiver of the service in the server, at the time of the preliminarily grasped start of the service and at the time of the termination of the service,
wherein the operating frequency change unit is configured to make the operating frequency of the target CPU higher than a predetermined value at the time of the start of the service and also make the operating frequency of the target CPU lower than the predetermined value at the time of the termination of the service,
wherein the preliminary grasp unit comprises:
an event capture unit configured to perform, as the predetermined method, capturing a phenomenon of occurrence of an event which is registered in advance as an event of a Kernel process of executing the service requiring low delay;
an event processing unit configured to,
when the captured event is an event of a control signal requesting a session establishment, preliminarily grasp the start of the service and acquire a receiver and a session ID of the service as information on session establishment from the control signal and,
when the captured event is an event of a control signal requesting a session termination, grasp the termination of the service and acquire the receiver and the session ID of the service as information on session termination from the control signal; and
a session state management unit configured to,
when the session state management unit acquires the information on session establishment, record the session ID of the service in a session state management book for the receiver of the service and notify the operating frequency change unit of an instruction to make the operating frequency of the target CPU higher, and,
when the session state management unit acquires the information on session termination, delete the session ID of the service from the session state management book, and, further, when all of the session IDs are deleted from the session state management book, notify the operating frequency change unit of an instruction to make the operating frequency of the target CPU lower.

2. The in-server frequency control apparatus according to claim 1,
wherein the operating frequency change unit comprises:
a frequency check unit configured to, when the frequency check unit receives an instruction to change the operating frequency of the target CPU from the preliminary grasp unit, check a current operating frequency of the target CPU; and
a frequency change unit configured to change the operating frequency of the target CPU in accordance with a result of comparing the current operating frequency of the CPU with a predetermined prescribed value,
wherein the frequency change unit is configured to,
when the frequency change unit receives an instruction to make the operating frequency of the CPU higher and also when the current operating frequency of the CPU is less than the prescribed value, make the operating frequency of the target CPU higher, and,
when the frequency change unit receives an instruction to make the operating frequency of the CPU lower and also when the current operating frequency of the CPU is more than the prescribed value, make the operating frequency of the target CPU lower.

3. An in-server frequency control apparatus comprising:
a preliminary grasp unit, comprising at least one processor, configured to preliminarily grasp a start of a service requiring low delay in a server and grasp termination of the service by a predetermined method; and
an operating frequency change unit, comprising at least one processor, configured to change an operating frequency of a CPU as a target to be controlled, the target CPU being allocated in advance to a receiver of the service in the server, at the time of the preliminarily grasped start of the service and at the time of the termination of the service,
wherein the operating frequency change unit is configured to make the operating frequency of the target CPU higher than a predetermined value at the time of the start of the service and also make the operating frequency of the target CPU lower than the predetermined value at the time of the termination of the service,
wherein the preliminary grasp unit comprises a first reservation status management unit configured to perform, as the predetermined method, monitoring a reservation scheduler which performs a process of reserving the service requiring low delay and sensing scheduled start information on the reserved service and termination information on the service, and
wherein the first reservation status management unit is configured to,
when the reservation status management unit acquires the scheduled start information on a service before the service starts, preliminarily grasp the start of the service, record a transmitter of the service in a reservation status management book for a receiver of the service, and notify the operating frequency change unit of an instruction to make the operating frequency of the target CPU higher, and,
when the reservation status management unit acquires the termination information on the service after the service terminates, grasp the termination of the service and delete the transmitter of the service from the reservation status management book, and, further, when all of the transmitters are deleted from the reservation status management book, notify the operating frequency change unit of an instruction to make the operating frequency of the target CPU lower.

4. The in-server frequency control apparatus according to claim 3,
wherein the operating frequency change unit comprises:
a frequency check unit configured to, when the frequency check unit receives an instruction to change the operating frequency of the target CPU from the preliminary grasp unit, check a current operating frequency of the target CPU; and a frequency change unit configured to change the operating frequency of the target CPU in accordance with a result of comparing the current operating frequency of the CPU with a predetermined prescribed value, wherein the frequency change unit is configured to,
when the frequency change unit receives an instruction to make the operating frequency of the CPU higher and also when the current operating frequency of the CPU is less than the prescribed value, make the operating frequency of the target CPU higher, and, when the frequency change unit receives an instruction to make the operating frequency of the CPU lower and also when the current operating frequency of the CPU is more than the prescribed value, make the operating frequency of the target CPU lower.

5. An in-server frequency control apparatus comprising:
a preliminary grasp unit, comprising at least one processor, configured to preliminarily grasp a start of a service requiring low delay in a server and grasp termination of the service by a predetermined method; and an operating frequency change unit, comprising at least one processor, configured to change an operating frequency of a CPU as a target to be controlled, the target CPU being allocated in advance to a receiver of the service in the server, at the time of the preliminarily grasped start of the service and at the time of the termination of the service, wherein the operating frequency change unit is configured to make the operating frequency of the target CPU higher than a predetermined value at the time of the start of the service and also make the operating frequency of the target CPU lower than the predetermined value at the time of the termination of the service, wherein the preliminary grasp unit comprises a second reservation status management unit configured to perform, as the predetermined method, receiving notification of scheduled start information on the reserved service and termination information on the service from a reservation scheduler which performs a process of reserving the service requiring low delay each time a reservation update is made, and wherein the reservation status management unit is configured to,
when the reservation status management unit acquires the scheduled start information on the service before the service starts, preliminarily grasp the start of the service, record a transmitter of the service in a reservation status management book for the receiver of the service, and notify the operating frequency change unit of an instruction to make the operating frequency of the CPU under control higher, and, when the reservation status management unit acquires the termination information on the service after the service terminates, grasp the termination of the service and delete the transmitter of the service from the reservation status management book, and, further, when all of the transmitters are deleted from the reservation status management book, notify the operating frequency change unit of an instruction to make the operating frequency of the target CPU lower.

6. The in-server frequency control apparatus according to claim 5,
wherein the operating frequency change unit comprises:
a frequency check unit configured to, when the frequency check unit receives an instruction to change the operating frequency of the target CPU from the preliminary grasp unit, check a current operating frequency of the target CPU; and a frequency change unit configured to change the operating frequency of the target CPU in accordance with a result of comparing the current operating frequency of the CPU with a predetermined prescribed value, wherein the frequency change unit is configured to,
when the frequency change unit receives an instruction to make the operating frequency of the CPU higher and also when the current operating frequency of the CPU is less than the prescribed value, make the operating frequency of the target CPU higher, and, when the frequency change unit receives an instruction to make the operating frequency of the CPU lower and also when the current operating frequency of the CPU is more than the prescribed value, make the operating frequency of the target CPU lower.

* * * * *